United States Patent [19]

Martin et al.

[11] Patent Number: 4,965,076

[45] Date of Patent: * Oct. 23, 1990

[54] SHELF STABLE COOKIE

[75] Inventors: August J. Martin, Aurora, Colo.; Raymond Mooi, Wyoming, Mich.

[73] Assignee: Keebler Company, Elmhurst, Ill.

[*] Notice: The portion of the term of this patent subsequent to Oct. 23, 2007 has been disclaimed.

[21] Appl. No.: 32,946

[22] Filed: Mar. 30, 1987

Related U.S. Application Data

[63] Continuation of Ser. No. 518,807, Jul. 29, 1983, abandoned.

[51] Int. Cl.$^5$ .................. A21D 10/00; A21D 8/04; A21D 6/00; A23L 1/105
[52] U.S. Cl. .................................. 426/18; 426/94; 426/103; 426/549; 426/560; 426/502
[58] Field of Search .............. 426/48, 18, 94, 103, 426/549, 560, 275, 502

[56] References Cited

U.S. PATENT DOCUMENTS

| | | | |
|---|---|---|---|
| 2,801,921 | 8/1957 | Moses | 426/48 |
| 3,026,205 | 3/1962 | Stone | 426/48 |
| 3,689,280 | 9/1972 | Werner | 426/502 |
| 3,851,084 | 11/1974 | Rossen et al. | 426/502 |
| 3,917,856 | 11/1975 | Wong et al. | 426/94 |
| 4,137,336 | 1/1979 | Radlove | 426/555 |
| 4,291,065 | 9/1981 | Zobel et al. | 426/549 |
| 4,344,969 | 8/1982 | Youngquist et al. | 426/18 |
| 4,455,333 | 6/1984 | Hong et al. | 426/560 |
| 4,752,484 | 6/1988 | Plfaumer et al. | 426/94 |

FOREIGN PATENT DOCUMENTS

| | | | |
|---|---|---|---|
| 0031718 | 7/1981 | European Pat. Off. | 426/560 |
| 2033135 | 1/1976 | Fed. Rep. of Germany | 426/48 |
| 2511847 | 9/1976 | Fed. Rep. of Germany | 426/549 |

OTHER PUBLICATIONS

Schanot, Michael A.; 'Sweeteners: Functionality in Cookies and Crackers'; *AIB Research Dept. Technical Bulletin*, vol. III, Issue 4, 1981; pp. 1–4.

Matz et al; *Cookie and Cracker Technology*, 2d edition, AVI Publ. Co. Inc., Westport Conn., 1968; pp. 36–38.

Baum et al.; *Chemistry A Life Science Approach*, 2d edition, Macmillan Publ. Co. Inc., New York, 1980; pp. 214–219.

Reed, *Enzymes in Food Processing*, 2d ed, Academic Press, New York, ©1975, p. 316.

Silberstein, "Enzymes in the Baking Industry", *Bakers Digest*, Dec. 1961, pp. 44–48 & 86.

Pyler, *Baking Science and Technology*, vol. 1, Siebel Publishing Co., Chicago, ©1973, pp. 121–143.

Matz, Samuel A., *Bakery Technology and Engineering*, 2d ed, AVI Publishing Co., Westport, Conn.; ©1972, pp. 49–60 & 199–206.

*Primary Examiner*—Elizabeth C. Weimar
*Attorney, Agent, or Firm*—Lockwood, Alex, FitzGibbon & Cummings

[57] ABSTRACT

A laminated dough perform, a method of forming a baked product therefrom, and the baked product, includes at least two premixed dough layers containing ingredients which, when baked, result in a substantially crumb continuous laminate product over the cross section of the laminate. The first dough layer contains sucrose which readily crystallizes when the laminate is baked so as to produce a first layer having a substantially crisp texture. The second dough layer contains sucrose and a second crystallization resistant sugar, such as invert sugar, fructose, high fructose corn syrup or mixture thereof, and also contains an enzyme active with the sucrose in the second dough in invert an amount of said sucrose which, together with the second sugar, is sufficient to substantially prevent the recrystallization of the sucrose in the second dough when the dough is baked and reaches textural equilibrium such that the second baked dough layer is shelf stable and has a substantially chewy texture relative to the first dough layer. The sucrose in the second dough layer may include a substantial portion of powdered sucrose and the preferred enzyme is invertase which may be present in an amount of about 0.04–3.0 wt. % of the second dough and has an activity of about 3000–200000 Sumner units/g. Where the second sugar is high fructose corn syrup it preferably does not exceed about 40 wt. % of the dough.

42 Claims, No Drawings

SHELF STABLE COOKIE

This application is a continuation of application Ser. No. 518,807, filed July 29, 1983, now abandoned.

BACKGROUND AND SUMMARY OF THE INVENTION

The present invention relates to a laminated dough preform, a method of making a baked product, and the product made therefrom and, more particularly, to a laminated, crumb continuous, shelf stable cookie.

United States Letters U.S. Pat. No. 4,344,969 (Youngquist et al.) contains a discussion of the mechanisms which occur in crumb continuous cookies following the baking thereof and it, together with European Published Application, Ser. No. 31,718, filed Dec. 12, 1980, also contain a disclosure of a quantitative method for measuring the freshness and shelf stability of such cookies. Both the Letters Patent and published Application hypothesize that a freshly baked, crumb continuous cookie, as it leaves the oven, will have a dichotomy of textures. This is because the outer surfaces of the cookie will tend to include crystallized sugars, i.e. sucrose, which become crystallized due to the baking process and which impart a generally crisp texture to the exterior surface of the cookie. Conversely, the center of such freshly baked cookies, however, will remain relatively soft and chewy, because the sucrose in the center of the cookie is still in a syrup, rather than crystalline form.

The aforementioned Letters Patent and Application further hypothesize that the reason that the freshness disappears in such freshly baked, crumb continuous cookies after a period of time is that the water in the syrups in the center of the cookie will ultimately tend to equilibrate throughout the cross-section of the cookie over a period of several days. Such equilibration results in the recrystallization of the sucrose in the cookie center and a loss of textural dichotomy over the cross-section of the cookie, even if the freshly baked cookies are stored in sealed containers.

Finally, the aforementioned Letters Patent and Application further observe that one approach which has been taken to overcome such loss of freshness is to form laminated dough structures in which a dough containing fructose or other crystallization resistant sugars is surrounded with a dough containing a typically readily crystallizable sugar. However, the Letters Patent observes that the latter approach necessitates the use of elaborate processing techniques to provide for the proper lamination of the two doughs. This is, in fact, a problem with the use of fructose and other crystallization resistant sugar containing laminates because doughs which contain sufficient amounts of fructose, fructose in combination with other sugars or high fructose corn syrup to remain chewy over extended shelf lives are generally sticky and difficult to work, handle and form, particularly in industrial processes. Moreover, it has been observed that such doughs exhibit poor crumb continuous structures and tend to collapse upon baking.

The Letters Patent says that it overcomes these disadvantages by forming a single dough mixture containing both sucrose and an enzyme. After this single dough is preformed into its cookie shape, it is first heated for a sufficient period of time and sufficient temperature to activate the enzyme in the center of the cookie, but to deactivate the enzyme in the exterior surfaces It is then necessary to maintain this activated/deactivated product at a lower, but still elevated temperature, for a sufficient period of time to enable the activated enzyme to work upon the sucrose. After this working, the dough is finally baked to form the desired baked product which, after textural equilibrium is reached, is said to be crumb continuous, but retains a dichotomy of textures to simulate, after shelf storage, a freshly baked cookie.

The present invention realizes a substantial number of advantages over either the product or method which employ fructose, fructose in combination with other sugars or high fructose corn syrup to prevent loss of freshness, as disclosed in both the aforementioned Letters Patent and the published Application, as well as over the single dough enzyme approach disclosed in the Letters Patent. Moreover, proceeding in accordance with the principles of the present invention will result in a superior, crumb continuous, shelf stable product which exhibits all of the qualities of freshness which are desired in the product, as well as the quantitative physical properties as discussed in the aforementioned Letters Patent and published Application, which are easy to handle and form industrially, and in which the quantities of relatively expensive enzymes may be substantially reduced and still achieve a superior product.

In the first instance, the present invention contemplates the formation of a laminate which may be baked into the final product By forming the dough as a laminate, precise control of textural dichotomy is possible as compared to the single dough employed in the aforementioned Letters Patent. Moreover, careful care need not be taken with respect to oven temperatures or time because selective activation and inactivation of enzymes is not relied upon in the present invention and precise control of outer crust rigidity is simplified due to the flexibility in oven temperatures and baking time, contrary to the aforementioned single dough procedure. Employment of laminates also enables precise control of the areas of the baked product which are influenced by the enzymes. The use of laminates also readily allows for different mixing procedures and formulations for the inner and outer layers of the product, thereby optimizing enzyme inversion rates and allowing varied sucrose and other sugars and enzyme compositions and treatments, such as the use of a substantial portion of powdered sucrose in the dough containing the enzyme to increase the rate of inversion of the sucrose by the enzyme and also allowing the use of other crystallization resistant sugars in the same layer. Lamination as in the present invention also results in the ability to vary the flavoring between the interior and exterior of the product and additional ingredients, such as chocolate chips, may be restricted solely to the inner layer to reduce band smearing during the manufacture of the product. Still another advantage of using the lamination procedures of the present invention, as opposed to the aforementioned single dough approach, is that two different doughs of somewhat dissimilar rheological characteristics may be employed in the product facilitating versatility of the formulation and the use of differing ingredients to optimize or reduce the cost of attaining the final desired textural characteristics of the baked product.

The present invention also realizes substantial advantages over the fructose, fructose together with other sugars, or high fructose corn syrup laminates disclosed in the aforementioned Application. In the first instance, the use of a combination of one or more crystallization resistant sugars together with enzyme/sucrose as in the present invention allows a reduction in the amount of crystallization resistant sugars used to a level that the handling and forming of the dough is not impaired by such sugars. Secondly, the presence of the crystallization resistant sugars together with the enzymes/sucrose as in the present invention allows a reduction in the amount of the relatively expensive enzymes which would otherwise be necessary if used alone to substantially prevent recrystallization of the sucrose after baking of the dough. Thirdly, and significantly, it has been found that, where crystallization resistant sugars in the dough are solely relied upon to prevent the recrystallization of the sucrose as disclosed in the Application, the crumb continuous quality after baking of the laminate product is poor. However, when such crystallization resistant sugars are combined with enzyme/sucrose as in the present invention, a product having excellent crumb continuous qualities is consistently produced.

The present invention also realizes substantial additional advantages over the aforementioned single dough approach. One considerable advantage of the present invention is that multiple ovens and holding sequences which are necessary in the single dough approach are avoided, substantially simplifying processing and reducing the capital equipment requirements which are admittedly necessary in the single dough approach. In the present invention, the enzyme activity rate is capable of precise time and temperature control and a separate heating step is not needed to inactivate the enzymes in the exterior or activate them in the interior of the dough. Moreover, in the present invention, the enzymes begin working on the sucrose prior to entry of the product into the oven for final baking and during final baking the inversion rate increases sufficiently to invert in situ an amount of the sucrose which, together with the crystalline resistant sugars which are already present in the dough, will substantially prevent recrystallization of the sucrose without separate heating or holding steps. Thus, elaborate buffer and leavening agents as disclosed in the aforementioned single dough process are unnecessary. Moreover, reduction in the amount of sucrose in the dough due to replacement by the crystallization resistant sugars reduces the amount of enzyme activity that is needed to result in the presence of a sufficient amounts of enzyme inversion products in the final product to inhibit crystallization during storage. Thereby, the necessary amount of total crystallization resistant sugars is reached sooner than in the prior single dough process and the amount of total enzymes may be reduced over those employed in the single dough process.

Still another advantage of the present invention is a superior quality of fine crumb in the inner layer of the product which may be achieved through the use of a substantial portion of powdered sucrose, instead of granulated sucrose, in combination with crystallization resistant sugars. The powdered sucrose also substantially increases the quality of the product and the rate of inversion of the sucrose, thereby substantially eliminating the need for preheating and interim holding of the product and the additional time and capital equipment for achieving these steps.

In one principal aspect of the present invention, a laminated dough preform comprises first and second premixed dough layers containing ingredients which, when baked, result in a substantially crumb continuous laminate over its cross-section. The first premixed dough layer also contains sucrose which readily crystallizes when the laminated dough preform is baked such that the first layer has a substantially crisp texture. The second premixed dough layer contains sucrose and a second crystallization resistant sugar, and also contains an enzyme which is active with the sucrose in the second layer to invert an amount of the sucrose which, together with the second sugar, is sufficient to substantially prevent the recrystallization of the sucrose in the second layer when the laminated dough preform is baked and reaches textural equilibrium such that the second layer has a shelf stable, substantially chewy texture relative to the first layer.

In another principal aspect of the present invention, a premixed dough preform contains sucrose and a second crystallization resistant sugar, and also contains an enzyme which is active with the sucrose to invert an amount of the sucrose which, together with the second sugar, is sufficient to substantially prevent the recrystallization of the sucrose when the dough is baked and reaches textural equilibrium such that the dough, when baked, has a shelf stable, substantially chewy texture.

In still another principal aspect of the present invention, a method of making a sweetened product comprises premixing of first and second doughs. The premixed first dough contains sucrose which readily crystallizes when the first dough is baked so as to produce a substantially crisp texture. The premixed second dough is capable of forming a crumb continuous laminate with the first dough over the cross-section of the laminate when the laminate is baked. The second dough includes sucrose and a second crystallization resistant sugar, and also contains an enzyme which is active with the sucrose in the second dough to invert an amount of the sucrose in the second dough which, together with the second sugar, is sufficient to substantially prevent the recrystallization of the sucrose in the second dough when the second dough is baked and reaches textural equilibrium so as to produce a substantially chewy, shelf stable texture. The first and second doughs are applied to each other to form a laminated dough structure thereof.

In still another principal aspect of the present invention, a baked product is formed by baking the aforementioned laminated dough structure.

In still another principal aspect of the present invention, the aforementioned enzyme is invertase.

In still another principal aspect of the present invention, the sucrose in the dough which contains the enzyme may include a substantial portion of which is powdered sucrose.

In still another principal aspect of the present invention, the second sugar may be invert sugar, fructose, high fructose corn syrup or mixture thereof.

In still another principal aspect of the present invention, the last mentioned syrup does not exceed about 40 wt.% of the total weight of the premixed second dough.

In still another principal aspect of the present invention, the enzyme is invertase and comprises about 0.04–3.0 wt.% of the second dough and has an activity of about 3000–200000 Sumner units/g.

These and other objects, features and advantages of the present invention will become evident upon consideration of the following detailed description.

DETAILED DESCRIPTION OF THE PREFERRED EMBODIMENTS

In the preferred embodiments of the present invention, two or more premixed dough layers are formed and laminated together.

One of the layers is formulated of typical dough ingredients, such as by way of example, typical cookie dough ingredients suitably containing flours, eggs or other binders, shortening, flavoring ingredients, water (in either syrup form or as directly added) and a substantial amount of sugar. In this first layer, the sugar preferably takes the form of granulated sucrose which, when the dough is baked, readily crystallizes to impart a substantially crisp texture to the dough.

The second layer may be formed of substantially similar ingredients with the exceptions to be noted to follow, or may contain one or more substantially dissimilar ingredients than those in the first layer. An example of the former may be oatmeal cookies in which oatmeal is contained in both the first and second layers. An example of the latter may be a peanut butter cup type cookie in which one layer contains substantial amounts of chocolate and the other layer substantial amounts of peanut butter. Another example of the latter may be a chocolate chip cookie in which chocolate chips are contained in only one of the layers, such as the second layer. What is important, however, is that whatever the ingredients are in the first and second layers, they should be substantially crumb continuous following baking.

The second layer also contains sucrose and one or more crystallization resistant sugars, such as fructose, invert sugar (which is a generally 50:50 blend of fructose and glucose), high fructose corn syrup or mixtures thereof. Although the last mentioned crystallization resistant sugars are preferred, other crystallization resistant sugars may be employed either singly or as mixtures. Examples of other such sugars are disclosed in the aforementioned published application. The invert sugar may be introduced in either solid or syrup form. The high fructose corn syrups may either be 42%, 55%, or up to 92% high fructose corn syrup, with the water content of the dough being adjusted as necessary depending upon whether solids or syrups are employed and on the concentration of the syrup which is used. What is important is that the amount of crystallization resistant sugars which are initially present in the second layer of dough should not exceed the amount which might cause the second layer to become syrupy or sticky such that handling and forming of the dough might be impaired and are insufficient to impair the crumb continuous quality of the final product after baking. In this respect it has been found that in doughs which contain high fructose corn syrup together with enzyme as will be discussed to follow, the syrup should not exceed about 40 wt.% of the total weight of the second dough.

According to the present invention, the second layer also contains sucrose and a sufficient amount of enzyme of a kind which is active with sucrose, such as invertase, to invert in situ an amount of the sucrose in the second layer dough which, together with the crystallization resistant sugar, will substantially prevent the recrystallization of the sucrose in the second layer when the dough is baked and reaches textural equilibrium, so that the second layer will exhibit the desired shelf stable, substantially chewy texture relative to the first layer and an excellent crumb continuous quality. In order to prevent such recrystallization and maintain such quality, the initially introduced crystallization resistant sugar or sugars together with the sucrose which is inverted by the enzyme should total at least 15% of the total sugars in the second layer and, more preferably, should be 50% or more. This will be achieved by an enzyme, such as invertase, which comprises about 0.04-3.0 wt.% of the second dough where the enzyme has an activity of about 3000-200000 Sumner units/g. For example, where the activity of the invertase is about 9000 Sumner units/g, about 1.5 wt.% enzyme is preferred.

In the context of the present invention, textural equilibrium is that state which is reached after baking, cooling and shelf storage, in a sealed condition, for several days after which further textural changes become nominal. Shelf stable is the condition in which the product is capable of maintaining soft chewy texture after equilibrium is reached for at least three weeks and, preferably, several months to a year.

The sucrose in the second dough layer may be either entirely granulated sucrose or may include a substantial portion of powdered sucrose the latter of which is preferably finely powdered, e.g. 6×. The use of powdered sucrose in this dough improves the texture of this dough layer, when baked, by further reducing the graininess or granularity of this dough layer. Such graininess might be present due to incomplete dissolving of the sucrose in the layer during the baking process, which might leave a substantial number of crystals of granulated sucrose in this second layer of the finished baked product. It will be appreciated, however, that replacement of a considerable amount of the sucrose which might otherwise be present with the essentially crystallization resistant sugars according to the present invention also tends to reduce the graininess of the second layer, thereby reducing and even eliminating the need for the powdered sucrose for this purpose.

Another advantage, however, of the powdered sucrose which makes it desirable is that the inversion rate of the relatively small amounts of enzyme which are present is substantially increased. This appears to be due to the fact that not only may the enzyme and powdered sucrose be intimately mixed before introduction to the second dough to insure uniform reactivity in the dough, but the small size of the powdered sucrose grains also substantially increases the rate of action of the enzyme on the powdered sucrose, thereby, substantially reducing the time and temperature necessary to effect the desired degree of in situ inversion of the sucrose during baking and the amount of enzyme itself which may be needed to achieve the desired degree of inversion. Indeed, when utilizing powdered sucrose in the second dough, the degree of inversion of the powdered sucrose necessary to produce a high quality, shelf stable, chewy texture in the dough, together with the crystallization resistant sugars already present, may be easily accomplished simply within the dough mixing and baking stages without the need for holding stages and stepped heating and baking operations and the attendant extra equipment necessary therefor as in the prior art. By way of example, the desired inversion can occur within the combined mixing and prebake time, which is typically 10-30 minutes at ambient temperatures, and from about 1-8 minutes of bake time.

In the preferred form of the present invention, the second dough is preferably formed as a layer in a laminate with an upper and lower layer of the first dough to realize the advantages of such laminates as previously described. After the dough is laminated, for example, by sheeting the several dough layers upon each other or by extruding the second dough simultaneously with an outer covering of the first dough, the laminated dough product may be cut into its desired cookie shapes and the edges pinched so as to completely enclose the second dough layer. At this point in time, the preferred weight ratio in the laminate of the outer first dough to the inner second dough should be approximately 35:65. It will be understood, however, that such weight ratio may be reasonably varied depending upon the nature of the final product which is desired.

Baking of the laminate preform may be at conventional temperatures and times. As the temperature of the second dough becomes elevated during baking, the inversion rate of the enzyme with respect to the sucrose in the second dough will substantially increase. Indeed, at somewhat elevated temperatures, such inversion rate will be extremely high, particularly where powdered sucrose is present, so that toward the end of the bake sufficient amounts of the sucrose will have been inverted which, together with the crystallization resistant sugars which were initially present, substantially prevent recrystallization of any of the sucrose in the second layer once baking has been completed.

Baking is preferably continued for a sufficient time to ultimately raise the second dough to a temperature which will deactivate the enzyme in the final product, the enzymes being heat labile.

Although it is believed that the present invention will be fully appreciated after considering the foregoing description, examples of preferred embodiments of the invention follow.

EXAMPLE 1

Two premixed batches of cookie dough are prepared as follows:

| Inner Second Dough | |
|---|---|
| Ingredients | Wt. % |
| High fructose corn syrup (55%) | 32.6 |
| Vanilla | 0.05 |
| Shortening, vegetable | 15.6 |
| Egg, dried whole | 0.9 |
| Lecithin | 0.9 |
| Sucrose, powdered 6X | 13.0 |
| Invertase (Sucrovert 3X, Ingredient Technology, approx. 9000 Sumner units/g) | 1.2 |
| Flour, bleached | 32.55 |
| Salt | 0.5 |
| Bicarbonate of soda | 0.5 |
| Modified Starch (Tender Gel) | 2.2 |

The high fructose corn syrup, vanilla, shortening and egg are first blended by mixing for 1 minute at speed 1, and then for 2 minutes at speed 2 on a Hobart mixer, Model No. N-50.

The lecithin, powdered sugar and invertase are then added to the last mentioned mixture and mixing is continued for 3 minutes on speed 2 of the mixer.

The flour, salt, bicarbonate of soda and starch are then added to the last mentioned mixture and mixing is continued for 4 minutes on speed 2 of the mixer.

| Outer First Dough | |
|---|---|
| Ingredients | Wt. % |
| Flour, bleached | 38.5 |
| Ice | 4.8 |
| Shortening, vegetable | 17.4 |
| Vanilla | 0.3 |
| Molasses, brown sugar | 2.1 |
| Sucrose, granulated | 32.0 |
| Sucrose, granulated | 2.4 |
| Fructose, crystalline | 0.4 |
| Emulsifier (sodium stearoyl 2-lactilate) | 0.4 |
| Dairy whey | 0.7 |
| Bicarbonate of Soda | 0.5 |
| Salt | 0.5 |

The flour and ice are added together and mixed for 5 minutes on speed 1 of the aforementioned Hobart mixer.

The shortening, vanilla, molasses and the first mentioned granulated sucrose are added to this last mentioned mixture and mixed for 2 minutes on speed 1, and then for 2 minutes at sped 2.

Finally, the remaining granulated sucrose, fructose, emulsifier, whey, bicarbonate of soda and salt are added to the last mentioned mixture and mixed for 4 minutes on speed 2.

EXAMPLE 2

Two premixed batches of cookie dough are prepared as follows:

| Inner Second Dough | |
|---|---|
| Ingredients | Wt. % |
| Invert Sugar Syrup (Amstar's "Freshvert" unplasticized) | 22.3 |
| Vanilla | 0.04 |
| Margarine | 10.7 |
| Whole eggs, dry | 0.6 |
| Lecithin | 0.6 |
| Sucrose, powdered 6X | 8.9 |
| Invertase (Sucrovert 3X) | 0.82 |
| Flour, bleached soft wheat (9% protein) | 22.4 |
| Salt | 0.37 |
| Sodium bicarbonate | 0.37 |
| Starch, pregelatinized | 1.9 |
| Chocolate drops, 2000 ct. | 31.0 |

The invert sugar syrup, vanilla, margarine, eggs and lecithin are first blended for 1 minute at speed 1, and then for 2 minutes at speed 2 of the mixer set forth in Example 1.

The powdered sucrose and invertase are added to the last mentioned mixture and blended for 3 minutes at speed 2.

The flour, salt, sodium bicarbonate and starch are added to the last mentioned mixture and mixed for 4 minutes at speed 2.

Finally, the chocolate drops are added and mixed thoroughly throughout the dough mixture.

| Outer First Dough | |
|---|---|
| Ingredients | Wt. % |
| Vanilla, 10X | 0.3 |
| Shortening, vegetable | 17.61 |
| Brown sugar molasses | 3.2 |
| Sucrose, granulated | 32.0 |
| Emulsifier, sodium steroyl 2-lactylate | 0.39 |

-continued

| Outer First Dough | |
|---|---|
| Ingredients | Wt. % |
| Water, chilled | 6.1 |
| Flour, bleached hard spring wheat (13–14% protein) | 19.41 |
| Flour, bleached soft wheat (9% protein) | 19.41 |
| Fructose, crystalline | 0.39 |
| Dairy whey | 0.70 |
| Sodium bicarbonate | 0.49 |

The vanilla, shortening, molasses, granulated sucrose and emulsifier are added together and creamed for 3 minutes at speed 2 of the mixer.

The water is then incorporated into the last mentioned mixture and mixed for 1 minute at speed 2.

Finally, the flour, fructose, whey and sodium bicarbonate are added to the last mentioned mixture and mixed for 2 minutes at speed 2.

EXAMPLE 3

The inner and outer doughs of each of Examples 1 and 2, respectively, are extruded continuously together and the extruded product is cross sectioned by cutting to form circular laminated dough discs. After cutting, each disc comprises a center of the inner second dough which weighs approximately 10g and the center is surrounded by the outer first dough which weighs about 6g.

Each of the laminated dough discs is then placed upon a baking band at 80° F. and is baked in an oven at 350° F. for 5.5 minutes.

Following baking, the baked laminated product samples are allowed to set at ambient temperature for about 20 sec. until their structure is rigid and then are freezer cooled for five minutes.

The baked inner second doughs of both the Example 1 and 2 samples exhibit an excellent soft fine structure which is crumb continuous with the outer first dough layers. The baked outer first dough layers of the Example 1 and 2 samples was crisp to the bite.

EXAMPLE 4

Two premixed batches of cookie dough are prepared as follows:

| Inner Second Dough | |
|---|---|
| Ingredients | Wt. % |
| High fructose corn syrup (42%) | 25.08 |
| Whole eggs | 4.06 |
| Starch, pregelatinized | 1.28 |
| Shortening (Crisco) | 10.73 |
| Lecithin | 0.32 |
| Dry vanilla, butter flavor | 0.11 |
| Invertase (Sucrovert 3X) | 1.53 |
| Sucrose, granulated | 18.14 |
| Flour, bleached, cake | 37.47 |
| Bicarbonate of soda | 0.96 |
| Salt | 0.32 |

The high fructose corn syrup, eggs and starch are first blended by mixing for 1 minute at speed 2 on the aforementioned mixer.

The shortening, lecithin and dry vanilla are then added to the last mentioned mixture and mixing is continued for 2 minutes on speed 3 of the mixer.

The invertase and granulated sucrose are then added to the last mentioned mixture and mixing is continued for 1 minute on speed 2 of the mixer.

Finally, the flour, bicarbonate of soda and salt are then added to the last mentioned mixture and mixing is continued for 10 sec. on speed 1, and then for sec. on speed 2 of the mixer.

| Outer First Dough | |
|---|---|
| Ingredients | Wt. % |
| Molasses | 1.94 |
| Shortening (Crisco) | 14.62 |
| Sucrose, granulated | 35.47 |
| Lecithin | 0.10 |
| Corn syrup (42 DE) | 1.94 |
| Vanilla (10X) | 2.33 |
| Whole eggs | 1.0 |
| Ice | 5.94 |
| Flour, bleached, cake | 35.76 |
| Bicarbonate of soda | 0.40 |
| Salt | 0.50 |

The molasses, shortening, granulated sucrose, lecithin, corn syrup and vanilla are added together and mixed for 4.5 minutes at speed 2 on the mixer.

The eggs and ice are added to this last mentioned mixture and mixing is continued for 4.5 minutes on speed 2.

Finally, the flour, bicarbonate of soda and salt are added to the last mentioned mixture and mixed for 2.5 minutes on speed 2.

EXAMPLE 5

The inner second dough, as set forth in Example 4, is formed into a single sheet of between 0.2–0.4 inch thickness by rolling by hand. The outer first dough, as set forth in Example 4, is also formed into a sheet of approximately 0.039–0.045 inch thickness, also by rolling by hand.

Circular discs are cut from the inner second dough sheet having a diameter of approximately 1.3 inches and weighing about 7.5 grams.

Two sets of circular discs are also cut from the outer first dough sheet. One set of discs have a diameter of approximately 2.0 inches and a weight of about 2.5 grams. The other set of discs have a diameter of approximately 1.54 inches and are about 2.0 grams in weight. Thus, when these discs are combined with the inner dough disc, the weight ratio of the outer dough to inner dough is about 38:62.

A number of laminated dough preforms are formed by applying the discs to each other. One of the inner second dough discs is superimposed upon the last mentioned outer first dough disc and the first mentioned outer dough disc is superimposed upon the inner dough disc to form a three layer laminate. Each of these laminate preforms are then flattened gently by hand and the edges are pinched to seal the inner dough discs between the outer dough discs.

Each of the laminated dough preforms is then placed upon a baking band at 80° F. and is baked in an oven at 370° F. for 6.5 minutes.

Following baking, the baked laminated product samples are fan cooled until their structure is rigid and then are freezer cooled for five minutes.

The baked inner second dough exhibits an excellent soft, fine structure which is slightly grainier than the baked inner second doughs of Examples 1 and 2, and is crumb continuous with the outer first dough layer. The baked outer first dough layer was crisp to the bite.

EXAMPLE 6

After cooling as set forth in Examples 3 and 5, each of the baked product samples are sealed in glass containers which are flushed with nitrogen. Stiffness and plasticity readings are then taken on various ones of the samples over a period of time. Such readings are taken and the difference between the maximum and minimum log of stiffness/plasticity is calculated, all as set forth in the aforementioned Letters Patent and the published Application. At intervals following bake, the samples are removed from their respective containers and the aforementioned tests are conducted. The difference between the maximum and minimum log of stiffness/plasticity of the samples made in accordance with Examples 4 and 5 are as follows:

| Days After Bake | Log Difference |
| --- | --- |
| 0 | 3.58 |
| 6 | 3.09 |
| 10 | 3.79 |
| 15 | 3.68 |
| 21 | 2.80 |

The differences between the maximum and minimum log of stiffness/plasticity of the samples made in accordance with Examples 1-3 are similar to the last mentioned log differences for similar time periods.

It will be understood that the embodiments of the invention which have been described are merely illustrative of a few of the applications of the principles of the present invention. Numerous modifications may be made by those skilled in the art without departing from the true spirit and scope of the invention.

What is claimed is:

1. A laminated dough preform comprising:
   first and second unbaked premixed dough layers containing dough ingredients including sucrose which, when baked, result in a substantially crumb continuous laminate over its cross section;
   said ingredients in said first premixed dough layer permitting said sucrose in said layer to readily crystallize when the laminated dough preform is baked such that said ingredients in said first layer produce a substantially crisp texture; and
   said second premixed dough layer containing a second sugar which is a crystallization resistant sugar, and also containing an enzyme which is active upon at least one of said dough ingredients in said second layer to produce in situ a sugar product in said second layer from said dough ingredient at least by completion of bake which, together with said second sugar, is sufficient to substantially prevent the recrystallization of the sucrose in said second layer when said laminated dough preform is baked and reaches textural equilibrium such that said second layer has a shelf stable, substantially chewy texture relative to said first layer.

2. The laminated dough preform of claim 1, wherein said enzyme is invertase.

3. The laminated dough preform of claim 1, wherein a substantial portion of said sucrose in said second layer comprises powdered sucrose 4. The laminated dough preform of claim 3, wherein said powdered sucrose is 6X.

5. The laminated dough preform of claim 3, wherein said enzyme is invertase.

6. The laminated dough preform of claim 5, wherein said dough is cookie dough.

7. The laminated dough preform of claim 1, wherein said dough is cookie dough.

8. The laminated dough preform of claim 1, wherein said second sugar is selected from the group consisting of invert sugar, fructose, high fructose corn syrup and mixtures thereof.

9. The laminated dough preform of claim 8, wherein said high fructose corn syrup does not exceed about 40 wt.% of the total weight of said second premixed dough layer.

10. The laminated dough preform of claim 9, wherein said enzyme is invertase and comprises about 0.04-3.0 wt.% of said second dough layer and has an activity of about 3000-200000 Sumner units/g.

11. The laminated dough preform of claim 10, wherein a substantial portion of said sucrose in said second premixed dough layer is powdered.

12. A premixed unbaked dough preform, said dough containing dough ingredients including sucrose and a second sugar which is a crystallization resistant sugar, and also containing an enzyme which is active upon at least one of said dough ingredients to produce in situ a sugar product in said dough from said ingredient at least by completion of bake which, together with said second sugar, is sufficient to substantially prevent the recrystallization of the sucrose when the dough is baked and reaches textural equilibrium such that said dough, when baked, has a shelf stable, substantially chewy texture.

13. The premixed dough preform of claim 12, wherein said enzyme is invertase.

14. The premixed dough preform of claim 12, wherein said sucrose is powdered.

15. The premixed dough preform of claim 14, wherein said dough is cookie dough.

16. The premixed dough preform of claim 12, wherein said dough is cookie dough.

17. The premixed dough preform of claim 12, wherein said second sugar is selected from the group consisting of invert sugar, fructose, high fructose corn syrup and mixtures thereof.

18. The premixed dough preform of claim 17, wherein said high fructose corn syrup does not exceed about 40 wt.% of the total weight of said premixed dough.

19. The premixed dough preform of claim 18, wherein said enzyme is invertase and comprises about 0.04-3.0 wt.% of said dough and has an activity of about 3000-200000 Sumner units/g.

20. A method of making a sweetened product comprising the steps of:
   premixing a first dough containing dough ingredients, including sucrose which readily crystallizes when the first dough is baked such that said dough ingredients produce a substantially crisp texture;
   premixing a second dough which is capable of forming a crumb continuous laminate over its cross section when laminated to and baked with said first dough, said second dough containing dough ingredients including sucrose and a second sugar which is a crystallization resistant sugar, and also containing an enzyme which acts upon at least one of said ingredients in said second dough to produce a sugar product in situ in that dough from said ingredient at least by completion of bake which, together with said second sugar, is sufficient to substantially prevent the recrystallization of the sucrose in said second dough when said second dough is baked and reaches textural equilibrium so as to produce a substantially chewy shelf stable texture; and applying said first and second doughs to each other to form a laminated dough structure thereof before baking.

21. The method of claim 20, including forming a laminated, crumb continuous baked product by baking said laminated dough structure.

22. The method of claim 21, wherein said baking is for a sufficient time and at a sufficient temperature to substantially inactivate said enzyme.

23. The method of claim 20, wherein said enzyme is invertase.

24. The method of claim 21, wherein said enzyme is invertase.

25. The method of claim 22, wherein said enzyme is invertase.

26. The method of claim 20, wherein a substantial portion of the sucrose in said second dough is powdered sucrose.

27. The method of claim 21, wherein a substantial portion of the sucrose in said second dough is powdered sucrose.

28. The method of claim 22, wherein a substantial portion of the sucrose in said second dough is powdered sucrose.

29. The method of claim 28, wherein said enzyme is invertase.

30. The method of claim 20, wherein said second sugar is selected from the group consisting of invert sugar, fructose, high fructose corn syrup and mixtures thereof.

31. The method of claim 30, wherein said high fructose corn syrup does not exceed about 40 wt.% of the total weight of said second dough.

32. The method of claim 31, wherein said enzyme is invertase and comprises about 0.04–3.0 wt.% of said dough and has an activity of about 3000–200000 Sumner units/g.

33. The method of claim 32, wherein a substantial portion of said sucrose in said second dough is powdered.

34. The product formed by the method of claim 20.

35. The product formed by the method of claim 30.

36. The premixed dough preform of claim 19, wherein said sucrose is powdered.

37. The method of claim 20, including the step of commencing the action of said enzyme on said ingredient before baking is commenced.

38. The method of claim 37, wherein the action of said enzyme is commenced during said premixing of said second dough.

39. The method of claim 23, including the step of commencing the action of said invertase on said sucrose before baking is commenced.

40. The method of claim 39, wherein the action of said invertase is commenced during said premixing of said second dough.

41. The method of claim 26, wherein said enzyme is invertase and the action of said invertase is commenced on said sucrose before baking is commenced.

42. The method of claim 41, wherein the action of said invertase is commenced during said premixing of said second dough.

* * * * *

UNITED STATES PATENT AND TRADEMARK OFFICE
CERTIFICATE OF CORRECTION

PATENT NO.   : 4,965,076
DATED        : October 23, 1990
INVENTOR(S)  : August J. Martin & Raymond Mooi It is certified that error appears in the above-identified patent and that said Letters Patent is hereby corrected as shown below:

In col. 2, line 1, after "surfaces" insert a period -- . --.

In col. 2, line 29, after "product" insert a period -- . --.

In col. 2, line 43, after "thereby" insert a comma -- , --.

In col. 8, line 22, delete "sped" and insert -- speed --.

Signed and Sealed this

Twenty-first Day of April, 1992

*Attest:*

HARRY F. MANBECK, JR.

*Attesting Officer*   *Commissioner of Patents and Trademarks*